No. 720,332. PATENTED FEB. 10, 1903.
W. O. DAY.
SAFETY ATTACHMENT FOR ELEVATORS.
APPLICATION FILED NOV. 23 1900.
NO MODEL.
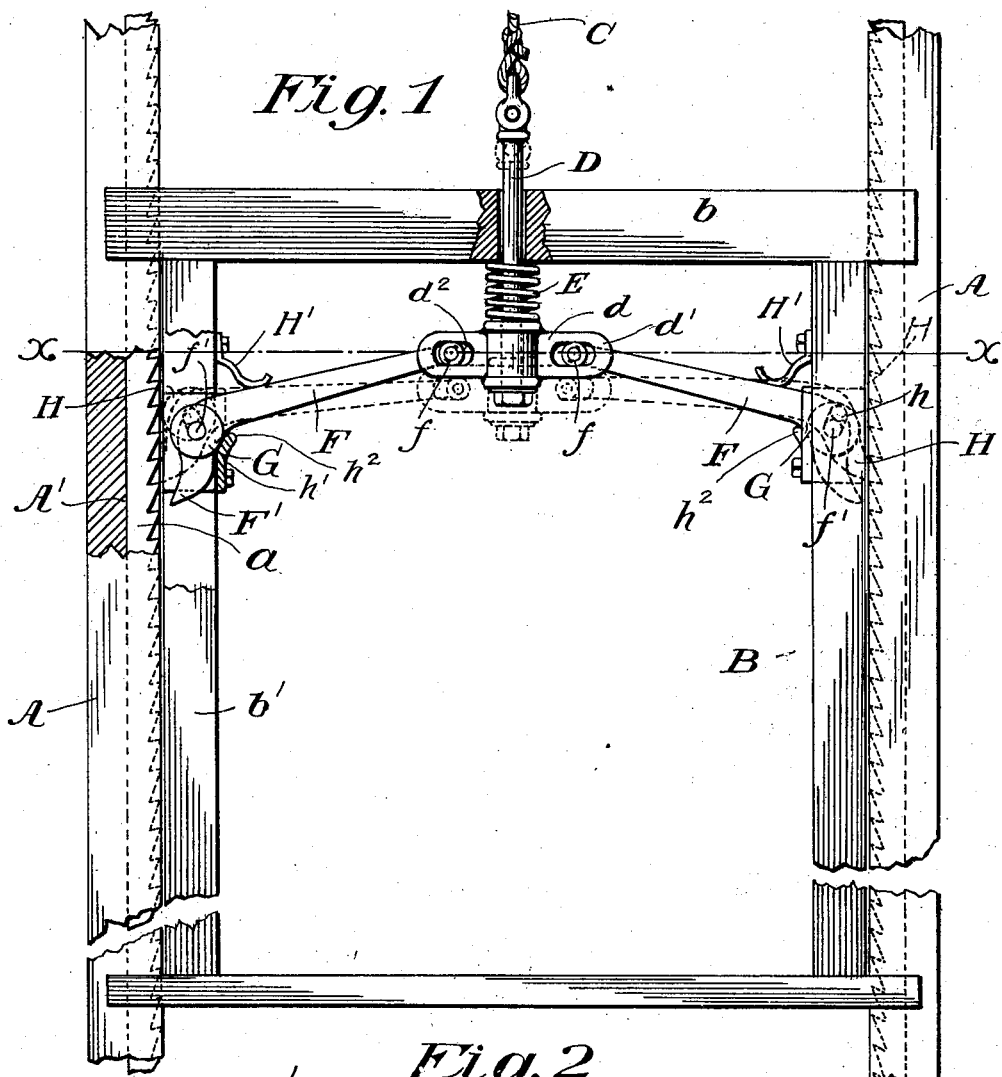
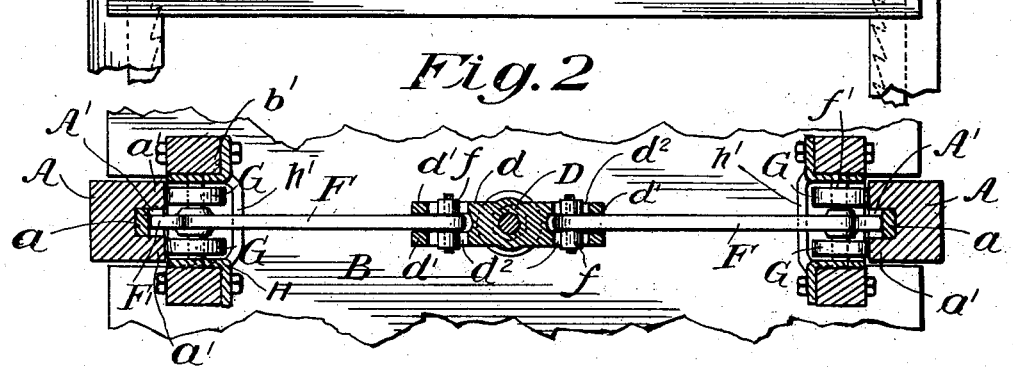
Witnesses—
Inventor—
William O. Day,
By his Atty

UNITED STATES PATENT OFFICE.

WILLIAM O. DAY, OF CHICAGO, ILLINOIS, ASSIGNOR OF ONE-HALF TO THORNTON WILLIAMS, OF CHICAGO, ILLINOIS.

SAFETY ATTACHMENT FOR ELEVATORS.

SPECIFICATION forming part of Letters Patent No. 720,332, dated February 10, 1903.

Application filed November 23, 1900. Serial No. 37,442. (No model.)

*To all whom it may concern:*

Be it known that I, WILLIAM O. DAY, of Chicago, in the county of Cook and State of Illinois, have invented a new and useful Improvement in Safety Attachments for Elevators, of which the following is a specification.

My invention relates to safety attachments wherein levers fulcrumed upon the opposite sides of the cage-timbers and extending at their inner ends to a bolt connected with the hoisting-rope of the shaft are adapted to engage at their outer ends by suitable means with the stationary side bars of the elevator-shaft when the hoisting-rope shall have given way sufficiently to let the inner ends of the said levers drop or be pressed down by weights or springs, thus to check or arrest the downward movement of the cage when the latter is not supported by the rope. In various devices heretofore employed for this purpose wherein serrated pawls are attached to the outer ends of the levers the side bars against which they take hold when the clutch or safety attachment is applied are torn and permanently damaged thereby, and the safety attachment is only applied as a last resort. When pawls alone at the outer ends of the levers are adapted to engage with a ratchet or rack-bar, either the pawls or the rack-bars are liable to break or be stripped, the safety attachment thus becoming useless.

The object of my invention is to provide a novel construction, combination, and arrangement of parts which will adapt both a pawl and ratchet and a roller-wedge lock to be used upon each side of the elevator-cage, the roller serving to check the cage when slowing down and also relieve the pawl and rack of a portion of the work of braking and completely arresting the downward descent of the cage when the latter is released by the hoisting-rope.

In the accompanying drawings, which illustrate my invention, Figure 1 is a vertical sectional elevation of an elevator, partly broken away, with my attachment applied thereto; Fig. 2, a horizontal section in line X X of Fig. 1, showing the side bars and part of the cage and safety attachment.

The guides A have channels A' in their inner faces, into which are secured rack-bars $a$, and are provided upon each side thereof with inwardly-projecting rails $a'$ $a'$, the rack and adjacent rails being adapted to engage, respectively, with a pawl and with the roller-wedge lock of the safety attachment.

The cage B is suspended by a rope C and hoisting mechanism, and the end of the rope is secured to the upper end of a bolt D, which passes through the upper cross-bar $b$ of the cage and is fitted at its lower end with a cross-head $d$, a spring E of suitable form being interposed between the upper cross-bar and the cross-head, thus to force the latter downward and away from the cross-bar $b$ when the hoisting-rope is released or gives way. The cross-head $d$ has two parallel plates $d'$ $d'$ upon each side of the bolt D, provided with horizontal slots $d^2$, which receive antifriction-rollers $f$ upon the inner ends of pawl-levers F, thus to hold up the inner ends of said levers when the bolt D is raised by the hoisting-rope. The pawl-levers F are pivoted on pivot-bolts $f'$, on which the wedge-rollers G are journaled, one on each side of each lever. The ends of said pivot-bolts are held in inclined slots $h$ in the bearing-plates H, secured to the uprights $b'$ of the elevator-gate. The outer ends of the levers F each carry a pawl F', adapted to engage with the rack-bars $a$ of the guides, while the wedge-rollers G G on the pivot-bolts of the levers are held opposite the rails $a'$ of the guides and are adapted to bear with great force thereon when the pawl-levers are released and the pivot-bolts moved upwardly and outwardly within the inclined slots of the bearing-plates. The pawls F' of the levers F will engage with the opposite tooth-racks when the levers are released, and thus provide a double-acting clutch device upon each side of the elevator-cage which will take hold of the guides A with ever-increasing force, even should either the pawl or the roller become damaged in any way. The bearing-plates H have a cross-plate $h'$, which extends from one upright to the other of the elevator-cage directly below the pawls F' and provides a fulcrum-point $h^2$, upon which the levers F may rest when the supporting-rope breaks and the said levers are pressed down by the spring E, thus forcing the pivot-bolt of the lever up the inclined slots $h$ in the bearing-plate to hold the wedge-rollers G in continuous contact with the guide-rails. Auxiliary springs H', bolted to the uprights of the elevator-cage, bear upon the levers F outside of the fulcrum-point $h^2$ and give to each of the said levers an action independent of and supplementary to the action of the spring E of the suspension-bolt.

I claim as my invention and desire to secure by Letters Patent—

1. A safety attachment for elevators comprising an elevator-shaft having guides and rack-bars secured thereto, of a cage having a bolt and a cross-head, a hoisting-rope, pawl-levers pivoted to the cage and adapted to engage with the racks upon the guides when released by the hoisting-ropes and means also carried on the pawl-levers acting to have clamping engagement with the guides when the hoisting-rope is released.

2. A safety attachment for elevators, comprising elevator-guides, a cage, a hoisting-rope, pawl-levers connected thereto having wedge-rollers thereon and pivotally supported upon the cage to bring both the pawl and wedge-rollers in contact with the guides when released by the hoisting-rope.

WILLIAM O. DAY.

Witnesses:
CARLE SCHAFER,
THORNTON WILLIAMS.